(12) United States Patent
Schnug

(10) Patent No.: US 9,815,497 B1
(45) Date of Patent: Nov. 14, 2017

(54) VEHICLES INCLUDING AN ENGINE COMPARTMENT SPACER MEMBER

(71) Applicant: Toyota Motor Engineering & Manufacturing North America, Inc., Erlanger, KY (US)

(72) Inventor: Tyler E. Schnug, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/147,447

(22) Filed: May 5, 2016

(51) Int. Cl.
  *B62D 21/15* (2006.01)
  *B62D 25/08* (2006.01)
(52) U.S. Cl.
  CPC ......... *B62D 21/152* (2013.01); *B62D 25/082* (2013.01)
(58) Field of Classification Search
  CPC ........................... B62D 21/152; B62D 25/082
  See application file for complete search history.

(56) References Cited

U.S. PATENT DOCUMENTS

| | | | |
|---|---|---|---|
| 6,408,974 B1 | 6/2002 | Viduya et al. | |
| 6,435,297 B1 | 8/2002 | Barber et al. | |
| 6,957,846 B2* | 10/2005 | Saeki | B62D 21/152 180/232 |
| 8,011,695 B2 | 9/2011 | Kosaka et al. | |
| 9,061,713 B2 | 6/2015 | Hashimoto et al. | |
| 9,505,444 B2* | 11/2016 | Tsuchida | B62D 21/152 |
| 2004/0200659 A1* | 10/2004 | Miyasaka | B62D 21/155 180/312 |
| 2010/0025143 A1 | 2/2010 | Gustavsson et al. | |
| 2012/0074732 A1* | 3/2012 | Yoshida | B62D 21/152 296/193.07 |
| 2014/0159420 A1* | 6/2014 | Hashimoto | B62D 21/152 296/187.1 |
| 2014/0312637 A1 | 10/2014 | Ramoutar et al. | |
| 2015/0246651 A1 | 9/2015 | Muraji et al. | |
| 2015/0283901 A1* | 10/2015 | Bernardi | B60K 5/1275 180/232 |
| 2016/0121931 A1* | 5/2016 | Tamaoki | B62D 21/152 296/187.09 |

FOREIGN PATENT DOCUMENTS

| | | |
|---|---|---|
| JP | 2014162347 | 9/2014 |
| WO | WO 95/12073 | 5/1995 |

* cited by examiner

*Primary Examiner* — Darlene P Condra
(74) *Attorney, Agent, or Firm* — Dinsmore & Shohl LLP

(57) ABSTRACT

A vehicle includes a side support extending in a vehicle longitudinal direction, a drive unit spaced apart from the side support in a vehicle lateral direction, where the drive unit includes a crankshaft extending in the vehicle lateral direction, and a spacer member positioned between the side support and the drive unit in the vehicle lateral direction, where the spacer member coupled to one of the drive unit and the side support, and the spacer member is detached and spaced apart from the other of the drive unit and the side support, and where the spacer member is positioned rearward of the crankshaft in the vehicle longitudinal direction.

20 Claims, 5 Drawing Sheets

VEHICLES INCLUDING AN ENGINE COMPARTMENT SPACER MEMBER

TECHNICAL FIELD

The present specification relates to vehicles including a spacer member positioned within an engine compartment, and in particular to vehicles including a spacer member positioned between a side support and a drive unit of the vehicle.

BACKGROUND

Vehicles may be equipped with bumper systems and impact protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and transferred rearward along the vehicle as the front suspension unit contacts vehicle structures proximate to a passenger cabin of the vehicle.

Accordingly, a need exists for alternative structures for transferring energy and absorbing energy from an impact with a small overlap to the front bumper.

SUMMARY

In one embodiment, a vehicle includes a side support extending in a vehicle longitudinal direction, a drive unit spaced apart from the side support in a vehicle lateral direction, where the drive unit includes a crankshaft extending in the vehicle lateral direction, and a spacer member positioned between the side support and the drive unit in the vehicle lateral direction, where the spacer member coupled to one of the drive unit and the side support, and the spacer member is detached and spaced apart from the other of the drive unit and the side support, and where the spacer member is positioned rearward of the crankshaft in the vehicle longitudinal direction.

In another embodiment, a vehicle includes a side support extending in a vehicle longitudinal direction, a suspension mount coupled to the side support, a drive unit spaced apart from the side support in a vehicle lateral direction, and a spacer member positioned between the side support and the drive unit in the vehicle lateral direction, where the spacer member is coupled to one of the drive unit and the side support, and the spacer member is detached and spaced apart from the other of the drive unit and the side support, and where at least a portion of the spacer member is aligned with the suspension mount in the vehicle longitudinal direction.

In yet another embodiment, a vehicle includes a side support extending in a vehicle longitudinal direction, a drive unit spaced apart from the side support in a vehicle lateral direction, where the drive unit includes a drive unit centerline that extends through a center of mass of the drive unit in the vehicle lateral direction, and a spacer member positioned between the side support and the drive unit in the vehicle lateral direction, where the spacer member is coupled to one of the drive unit and the side support, and the spacer member is detached and spaced apart from the other of the drive unit and the side support, and where the spacer member is positioned rearward of the drive unit centerline in the vehicle longitudinal direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present disclosure include a side support and a drive unit, such as an internal combustion engine, that is spaced apart from the side support. A spacer member is positioned at a rearward portion of the drive unit and is positioned between the drive unit and the side support. The spacer member is coupled to one of the drive unit and the side support and is spaced apart from the other of the drive unit and the side support during ordinary vehicle operation. During an impact, such as a small overlap impact, the spacer member contacts the side support and the drive unit and may assist in directing energy and/or forces associated with the impact into the side support. By positioning the spacer member between the drive unit and the side support, the drive unit may contact the side support at an earlier time during the impact as compared to vehicles that do not include a spacer member, which may assist in directing energy and/or forces into the side support and reducing the energy and/or forces associated with the impact that are directed into a cabin of the vehicle. These and other embodiments will be described in more detail below in reference to the appended drawings.

Figure 1:
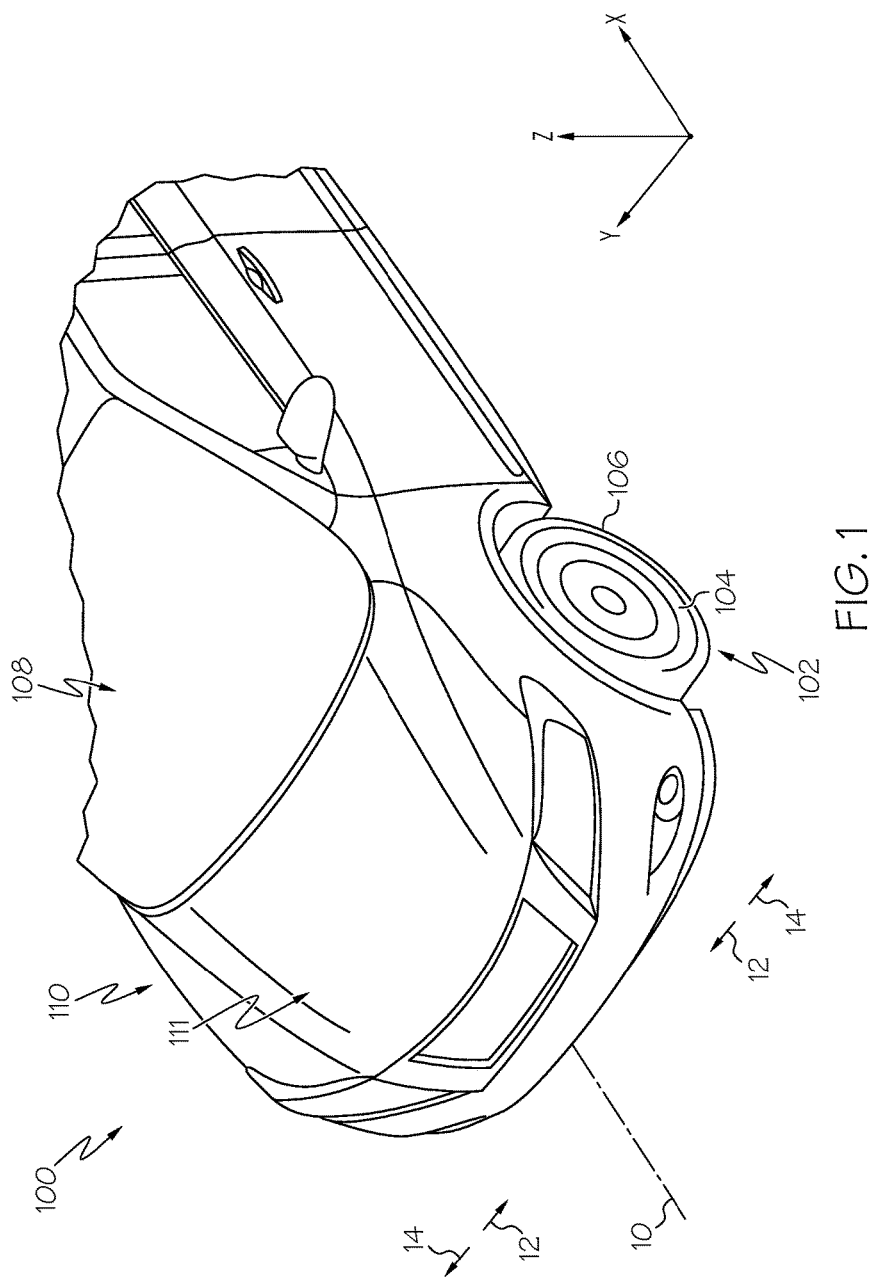
FIG. 1 schematically depicts a vehicle according to one or more embodiments shown and described herein.

As used herein, the term "vehicle longitudinal direction" refers to the forward-rearward direction of the vehicle (i.e., in the +/−vehicle X-direction as depicted). The term "vehicle lateral direction" refers to the cross-vehicle direction (i.e., in the +/−vehicle Y-direction as depicted), and is transverse to the vehicle longitudinal direction. The term "vehicle vertical direction" refers to the upward-downward direction of the vehicle (i.e., in the +/−vehicle Z-direction as depicted). Further, the terms "inboard" and "outboard" are used to describe the relative positioning of various components of the vehicle. Referring to FIG. 1, the term "outboard" as used herein refers to the relative location of a component in direction 14 with respect to a vehicle centerline 10. The term "inboard" as used herein refers to the relative location of a component in direction 12 with respect to the vehicle centerline 10. As the vehicle structures may be generally symmetrical about the vehicle centerline 10, the direction to which use of the terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While embodiments of the present disclosure are described and depicted herein in reference to unibody structures, it should be understood that vehicles that are constructed with body-on-frame construction may incorporate the elements that are shown and described herein. Furthermore, the appended figures may only show one side of the vehicle. Descriptions of the other side of the vehicle may be omitted as both sides of the vehicle may be laterally symmetrical and substantially the same.

Referring initially to FIG. 1, a vehicle 100 is depicted. The vehicle 100 includes a body 110, to which a vehicle drivetrain is coupled. The vehicle 100 includes a cabin 108 that is integral with the body 110, and an engine compartment 111 that is positioned forward of the cabin 108 in the vehicle longitudinal direction. The cabin 108 generally defines a passenger cabin of the vehicle 100. A front suspension unit 102 is coupled to the body 110, and the front suspension unit 102 may generally include vehicle components that connect the body 110 to a tire 106. The front suspension unit 102 may include a wheel 104 that is surrounded by the tire 106.

Figure 2:
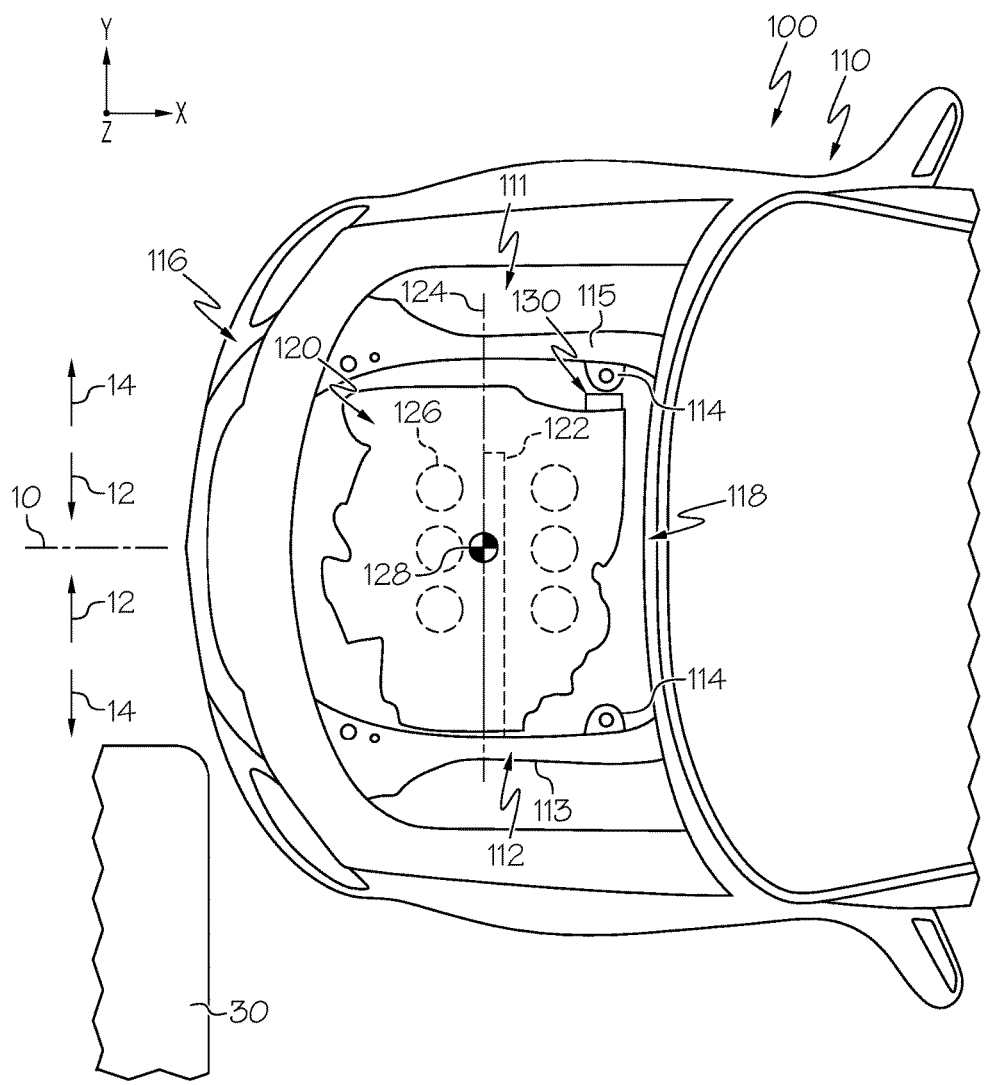
FIG. 2 schematically depicts a top view of an engine compartment of the vehicle of FIG. 1 according to one or more embodiments shown and described herein.

Referring to FIG. 2, a top view of the engine compartment 111 is depicted. The engine compartment 111 is positioned at a front portion of the vehicle 100, and is positioned between a front bumper 116 and a dash panel 118 in the vehicle longitudinal direction. A drive unit 120 of the vehicle 100 is positioned within the engine compartment 111 and provides motive force to the vehicle 100. The drive unit 120 is coupled to the body 110 of the vehicle 100 and may be positioned on engine mounts.

In the embodiment depicted in FIG. 2, the drive unit 120 includes an internal combustion engine, however, it should be understood that the drive unit 120 may include other drive sources, including, but not limited to, an electric motor, a hybrid electric motor, or the like. The drive unit 120 includes a crankshaft 122 that extends through the drive unit 120 in the vehicle lateral direction. The crankshaft 122 is coupled to pistons positioned within cylinders 126 of the drive unit 120, and the crankshaft 122 converts linear motion of the pistons into rotational motion that provides motive force to the vehicle 100.

The drive unit 120 further includes a drive unit centerline 124 that extends through a center of mass 128 of the drive unit 120 in the vehicle lateral direction. In some embodiments, the drive unit centerline 124 bisects the crankshaft 122 of the drive unit 120. In other embodiments, the drive unit centerline 124 may be positioned forward or rearward of the crankshaft 122 in the vehicle longitudinal direction. Accordingly, in some embodiments, the crankshaft 122 extends through the center of mass 128 of the drive unit 120, while in other embodiments, the crankshaft 122 may be positioned forward or rearward of the center of mass 128 of the drive unit 120 in the vehicle longitudinal direction.

The body 110 of the vehicle 100 includes side supports 112 that extend in the vehicle longitudinal direction. In the embodiment depicted in FIG. 2, the vehicle 100 includes a first side support 113 and a second side support 115 that extend in the vehicle longitudinal direction, and the first side support 113 and the second side support 115 are spaced apart from one another in the vehicle lateral direction. A suspension mount 114 is coupled to each of the first side support 113 and the second side support 115, and the front suspension units 102 (FIG. 1) may be coupled to each of the front suspension mounts 114. The suspension mounts 114 may extend inboard of the first side support 113 and the second side support 115 in the vehicle lateral direction, respectively. In embodiments, the suspension mounts 114 are positioned rearward of the crankshaft 122 of the drive unit and/or the drive unit centerline 124 in the vehicle longitudinal direction.

In embodiments, the drive unit 120 is positioned between the first side support 113 and the second side support 115 in the vehicle lateral direction. The drive unit 120 is also spaced apart from the first side support 113 and the second side support 115 in the vehicle lateral direction, which may assist in reducing the transmission of vibration from the drive unit 120 to the first side support 113 and the second side support 115, and accordingly to the cabin 108 (FIG. 1) of the vehicle 100.

Figure 3:
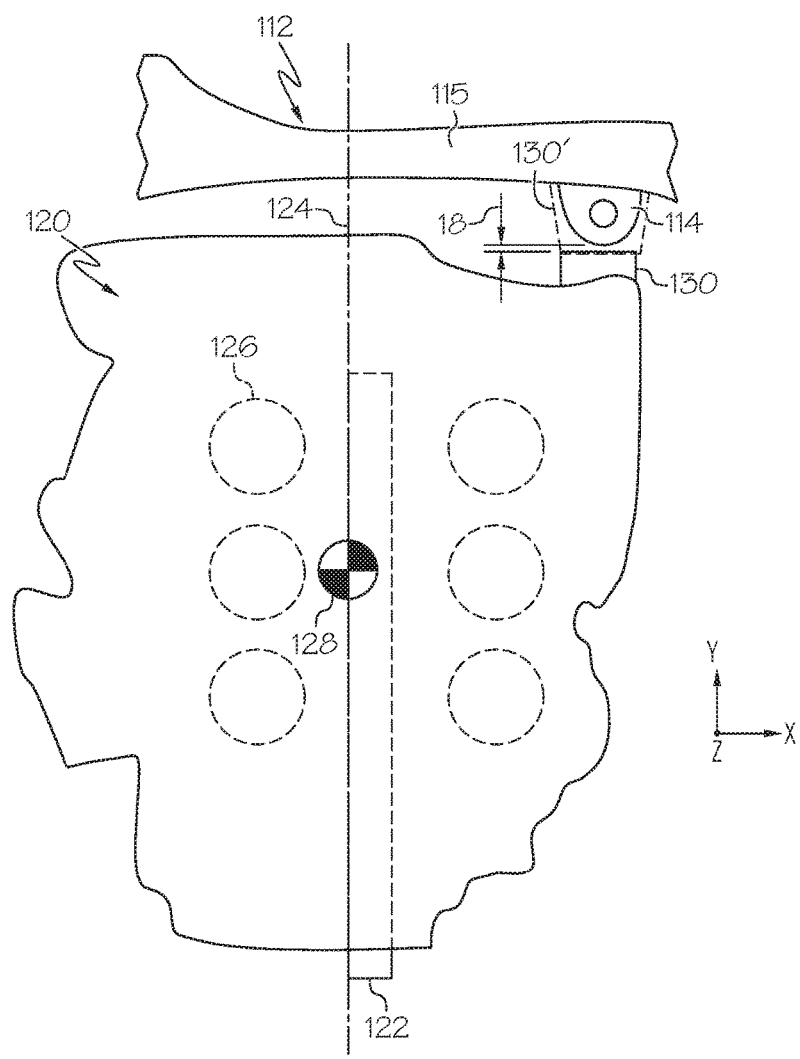
FIG. 3 schematically depicts a top view of a drive unit, a side support, and a spacer member of the vehicle of FIG. 1 shown in isolation according to one or more embodiments shown and described herein.

The vehicle 100 includes a spacer member 130 that is coupled to one of the drive unit 120 or one of the side supports 112, and the spacer member 130 is spaced apart from the other of the drive unit 120 or the side supports 112. In the embodiment depicted in FIG. 2, the spacer member 130 is coupled to the drive unit 120 and is spaced apart from the second side support 115 in the vehicle lateral direction. Alternatively, as schematically illustrated in FIG. 3, a spacer member 130' may be coupled to the second side support 115 and spaced apart from the drive unit 120 in the vehicle lateral direction. In some embodiments, a spacer member 130 may alternatively or additionally be coupled to one of the drive unit 120 or the first side support 113, and may be spaced apart from the other of the drive unit 120 or the first side support 113. Where the spacer member 130 is coupled may depend, at least in part, on the geometries and position of the drive unit and the side supports 112.

Referring to FIG. 3, the drive unit 120, the second side support 115, and the spacer member 130 are depicted in isolation. In the embodiment depicted in FIG. 3, the spacer member 130 is positioned between the drive unit 120 and the second side support 115 in the vehicle lateral direction. In embodiments, the spacer member 130 is positioned at a rear portion of the drive unit 120 in the vehicle longitudinal direction. In particular, in the embodiment depicted in FIG. 3, the spacer member 130 is positioned such that at least a portion of the spacer member 130 is aligned with and opposes the suspension mount 114 in the vehicle longitudinal direction. The spacer member 130 is also positioned rearward of the drive unit centerline 124 and the center of mass 128 of the drive unit 120 in the vehicle longitudinal direction. In some embodiments, the spacer member 130 is positioned rearward of the crankshaft 122 of the drive unit 120. By positioning the spacer member 130 at a rearward portion of the drive unit 120 opposing the suspension mount 114, the spacer member 130 may assist in directing and dissipating forces and/or energy associated with a small front bumper overlap impact to the second side support 115, as will be described in greater detail herein.

During ordinary vehicle operation, such as shown in FIG. 3, the spacer member 130 is positioned in a disengaged position, in which the spacer member 130 is coupled to the drive unit 120 and is spaced apart from the second side support 115. As indicated above, the spacer member 130 may be coupled to the second side support 115 and spaced apart from the drive unit 120 in the disengaged position. The spacer member 130 is repositionable from the disengaged position, as shown in FIG. 3, to an engaged position, in which the spacer member 130 closes a gap 18 between the spacer member 130 and the suspension mount 114 and contacts both the drive unit 120 and the second side support 115, as will be described in greater detail herein.

Figure 4A:
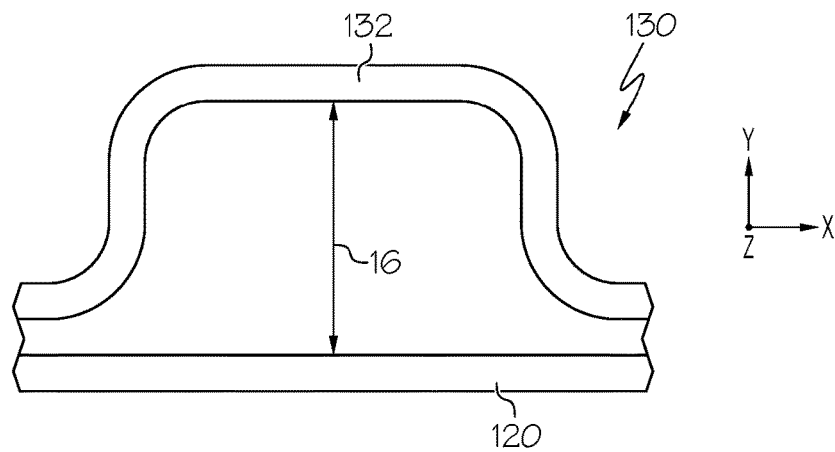
FIG. 4A schematically depicts a top view of one spacer member shown in isolation according to one or more embodiments shown and described herein.

Referring to FIG. 4A, one embodiment of the spacer member 130 is depicted in isolation. In the embodiment depicted in FIG. 4A, the spacer member 130 includes a panel 132 that is coupled to and spaced apart from the drive unit 120 in the vehicle lateral direction. In particular, the panel 132 may be spaced apart from the drive unit 120 by a gap 16 in the vehicle lateral direction. The spacer member 130 may be formed from a variety of materials including, for example and without limitation, metals, composites, and the like, and may be formed by any suitable method or combination of methods such as stamping, forging, machining, and the like. The panel 132 of the spacer member 130 may be coupled to the drive unit 120 by a variety of attachments methods including, for example and without limitation, a welded attachment, a brazed attachment, mechanical fasteners, and/or structural adhesives. During an impact, such as a small overlap impact, the panel 132 of the spacer member 130 may contact the second side support 115 (FIG. 3), and may selectively deform, absorbing energy associated with the impact, as will be described in greater detail herein.

Figure 4B:
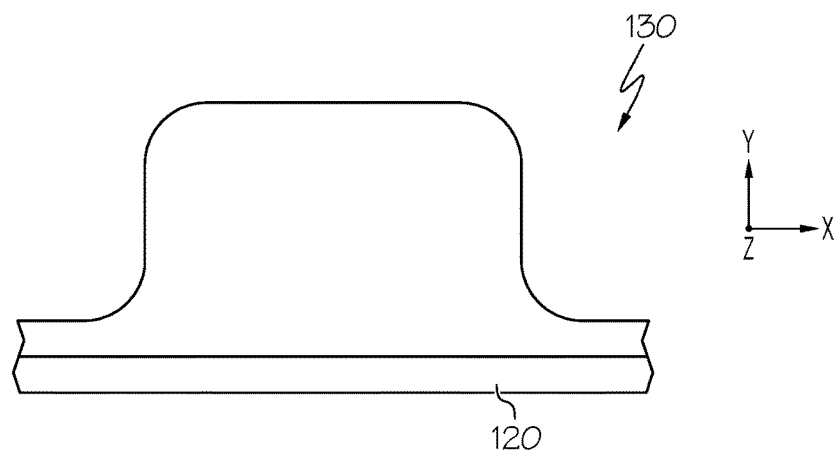
FIG. 4B schematically depicts a top view of another spacer member shown in isolation according to one or more embodiments shown and described herein.

Referring to FIG. 4B, another embodiment of the spacer member 130 is depicted in isolation. In the embodiment depicted in FIG. 4B, the spacer member 130 includes a solid construction that is coupled to the drive unit 120. Similar to the embodiment depicted in FIG. 4A, in this embodiment, the spacer member 130 may be formed from a variety of materials including, for example and without limitation, metals, composites, and the like, and may be formed by any suitable method or combination of methods such as stamping, forging, machining, and the like. Similarly, the spacer member 130 may be coupled to the drive unit 120 by a variety of attachments methods including, for example and without limitation, a welded attachment, a brazed attachment, mechanical fasteners, and/or structural adhesives. During an impact, such as a small overlap impact, the spacer member 130 may contact the second side support 115 (FIG. 3) and may direct energy and/or forces associated with the impact into the second side support 115, as will be described in greater detail herein.

When a vehicle impacts a barrier, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

The front corner of the vehicle may impact an object in what is referred to herein as a small front bumper overlap or a small overlap impact. In a small front bumper overlap impact, the impact occurs at an outboard portion of the vehicle (evaluated in a vehicle lateral direction), and only a portion of the front bumper strikes the object. In some small front bumper overlap impacts, no more than about 25% of the front bumper strikes the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the body 110 may be non-symmetrically loaded when the vehicle is involved in a small overlap impact.

Because only a portion of the front bumper strikes an object during a small front bumper overlap impact, all of the energy absorbing structures associated with the front bumper may have a reduced effect on the dissipation of energy of the impact. In particular, some of the energy absorbing structures associated with the bumper of the vehicle 100 may not be activated or may be only partially activated, such that a portion of the energy absorbing structures of the vehicle may not dissipate energy associated with the small front bumper overlap impact. Instead, the energy and/or forces associated with the impact may be directed into the front suspension unit 102 of the vehicle 100 proximate to the barrier that the vehicle impacts. As energy from the impact may be directed into the front suspension unit 102 of the vehicle 100, the front suspension unit 102 may translate rearward in the vehicle longitudinal direction and may contact the cabin 108 of the vehicle, transmitting energy and/or forces associated with the impact into the cabin 108 of the vehicle 100.

Figure 5:
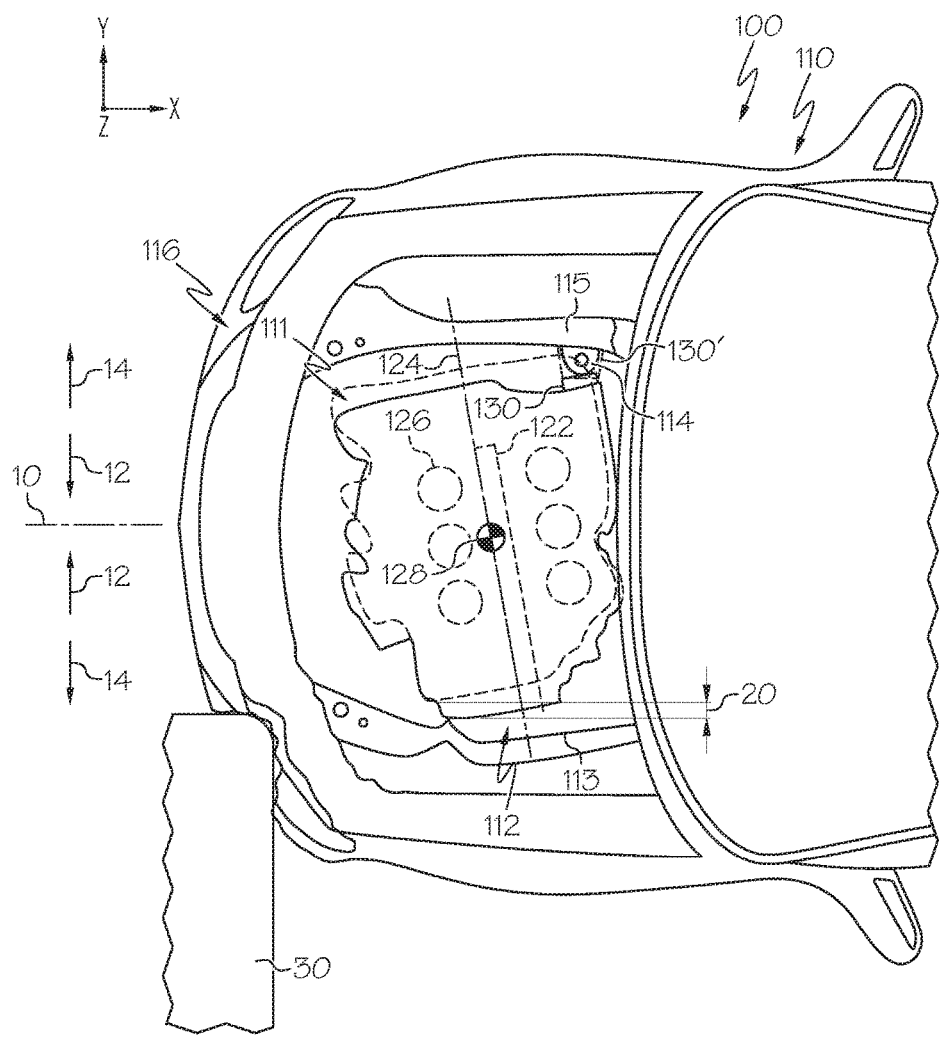
FIG. 5 schematically depicts a top view of the engine compartment of the vehicle of FIG. 1 in a small overlap impact according to one or more embodiments shown and described herein.

Referring to FIG. 5, a top view of the engine compartment 111 of the vehicle 100 is depicted during a small front bumper overlap impact. As shown in FIG. 5, a barrier 30 impacts the vehicle 100 at an outboard position of the front bumper 116. In particular, in the impact depicted in FIG. 5, the barrier 30 impacts the vehicle 100 proximate to the first side support 113 and the impact is distal from the second side support 115 in the vehicle lateral direction. As the barrier 30 impacts the front bumper 116, the front bumper 116 plastically and elastically deforms, and may move rearward in the vehicle longitudinal direction. As the front bumper 116 moves rearward, the first side support 113 deforms and may move inboard in the vehicle lateral direction.

Energy and/or forces associated with the impact may be directed into the drive unit 120 through contact with the front bumper 116 and/or the first side support 113, and may cause the drive unit 120 to move toward the second side support 115 in the vehicle lateral direction. In some impact configurations, the drive unit 120 may rotate about the vehicle vertical direction, such that a rear portion of the drive unit 120 moves toward the second side support 115 and away from the barrier 30 in the vehicle lateral direction.

As the drive unit 120 moves away from the barrier 30 in the vehicle lateral direction, the drive unit 120 impacts the second side support 115. As the drive unit 120 contacts the second side support 115, energy and/or forces associated with the impact may be transferred through the drive unit 120 to the second side support 115. In embodiments, the drive unit 120 may be generally rigid, such as when the drive unit 120 includes an internal combustion engine, and the drive unit 120 may experience little or no plastic or elastic deformation during impact. Instead, as the drive unit 120 contacts the second side support 115, forces and/or energy associated with the impact may be transmitted through the drive unit 120 to the second side support 115. As the drive unit 120 contacts the second side support 115, the second side support 115 may plastically and elastically deform, thereby absorbing energy associated with the impact and reducing the amount of energy associated with the impact that may be transmitted to the cabin 108 of the vehicle 100.

As described above, the spacer member 130 is positioned between the drive unit 120 and the second side support 115 in the vehicle lateral direction. As also noted, the spacer member 130 may be coupled to the drive unit or, as schematically illustrated, the spacer member 130' may be coupled to the second side support. Further, as described above, the spacer member 130 is positioned at a rear portion of the drive unit 120, such that the spacer member 130 may contact the second side support 115 as the drive unit 120 moves toward the second side support 115 in the vehicle lateral direction. As the spacer member 130 moves toward the second side support 115 in the vehicle lateral direction, the spacer member 130 moves from a disengaged position, as shown in FIG. 2, to an engaged position in which the spacer member 130 contacts the drive unit 120 and the second side support 115 and/or the suspension mount 114, as shown in FIG. 5.

Because the spacer member 130 is positioned between the drive unit 120 and the second side support 115, the spacer member 130 may reduce a distance between the drive unit 120 and the second side support 115 in the vehicle lateral direction. During an impact, such as the small overlap impact shown in FIG. 5 the drive unit 120 may contact the second side support 115 at an earlier time during the impact as compared to vehicles that do not include a spacer member 130. By contacting the second side support 115 earlier during the impact, more energy and/or forces associated with the impact may be directed into the second side support 115, thereby distributing energy associated with the impact between the first side support 113 and the second side support 115, which may reduce the amount of forces and/or energy associated with the impact being directed into the cabin 108.

Additionally, as the spacer member 130 reduces the distance between the drive unit 120 and the second side support 115, during an impact, the spacer member 130 may reduce lateral movement of the drive unit 120 within the engine compartment 111 as compared to vehicles 100 that do not include a spacer member 130. In particular and still referring to FIG. 5, a drive unit of a vehicle that does not include a spacer member is shown in dashed lines. As the spacer member 130 reduces the distance between the drive unit 120 and the second side support 115 in the vehicle lateral direction, the spacer member 130 may reduce a distance 20 that the drive unit 120 moves in the vehicle lateral direction within the engine compartment 111 as compared to a vehicle that does not include the spacer member 130.

By reducing the amount of lateral movement of the drive unit 120 within the engine compartment 111 during the impact, energy and/or forces associated with the impact may direct the vehicle 100 away from the barrier 30 instead of moving the drive unit 120 in the vehicle lateral direction within the engine compartment 111. In particular, as described above, the drive unit 120 may be generally rigid, such that the drive unit 120 may experience little or no plastic or elastic deformation during impact and energy and/or forces associated with the impact may be transmitted through the drive unit 120. Accordingly, during an impact, when the first side support 113 and the second side support 115 are both in contact with the drive unit 120, energy and/or forces associated with the impact may move the first side support 113, the drive unit 120, the second side support 115, and accordingly the body 110 of the vehicle away from the barrier 30 in the vehicle lateral direction. By moving the body 110 of the vehicle 100 away from the barrier 30 during the impact, the overall amount of energy and/or forces directed into the body 110 of the vehicle 100 may be reduced as compared to vehicles that are not directed away from the barrier 30 in the vehicle lateral direction. In this way, the spacer member 130 may reduce the energy and/or forces associated with the impact that are directed into the body 110 of the vehicle 100 as compared to vehicles that do not include the spacer member 130.

Further, by reducing the amount of movement of the drive unit 120 in the vehicle lateral direction within the engine compartment 111 during an impact, the spacer member 130 may assist in encouraging plastic and elastic deformation of the first side support 113. In particular, limiting movement of the drive unit 120 in the vehicle lateral direction within the engine compartment 111 may assist in maintaining the first side support 113 in a generally longitudinal orientation. As described above, during a small overlap impact, such as the impact shown in FIG. 5, the first side support 113 may move inboard in the vehicle lateral direction away from the impact. By limiting the lateral movement of the drive unit 120, the spacer member 130 may also assist in liming the lateral movement of the first side support 113 and may assist in maintaining the side support 113 in a generally longitudinal orientation. By maintaining the first side support 113 in a generally longitudinal orientation, the first side support 113 may plastically and elastically deform, absorbing more energy associated with the impact as compared to impact configurations in which the first side support 113 is allowed to deflect inboard and away from the impact in the vehicle lateral direction. As the first side support 113 plastically and elastically deforms, the first side support 113 may absorb energy associated with the impact, thereby reducing the amount of energy associated with the impact that is directed into the cabin 108 of the vehicle 100.

In some embodiments and impact configurations, the spacer member 130 may selectively deform upon contact with the second side support 115, thereby absorbing energy associated with the impact and reducing the amount of energy directed toward the cabin 108 (FIG. 1) of the vehicle 100. In other embodiments, such as when the spacer member 130 includes a rigid construction, the spacer member 130 may experience little or no plastic or elastic deformation, and may transmit energy and/or force associated with the impact to the second side support 115.

It should now be understood that vehicles according to the present disclosure include a side support and a drive unit, such as an internal combustion engine, that is spaced apart from the side support. A spacer member is positioned at a rearward portion of the drive unit and is positioned between the drive unit and the side support. The spacer member is coupled to one of the drive unit and the side support and is spaced apart from the other of the drive unit and the side support during ordinary vehicle operation. During an impact, such as a small overlap impact, the spacer member contacts the side support and the drive unit and may assist in directing energy and/or forces associated with the impact into the side support. By positioning the spacer member between the drive unit and the side support, the drive unit may contact the side support at an earlier time during the impact as compared to vehicles that do not include a spacer member, which may assist in directing energy and/or forces into the side support and reducing the energy and/or forces associated with the impact that are directed into a cabin of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a side support extending in a vehicle longitudinal direction;
a drive unit spaced apart from the side support in a vehicle lateral direction, wherein the drive unit comprises a crankshaft extending in the vehicle lateral direction; and
a spacer member positioned between the side support and the drive unit in the vehicle lateral direction, wherein the spacer member is coupled to one of the drive unit and the side support, and the spacer member is detached and spaced apart from the other of the drive unit and the side support, and wherein the spacer member is positioned rearward of the crankshaft in the vehicle longitudinal direction.

2. The vehicle of claim 1, wherein the spacer member is coupled to the drive unit and is spaced apart from the side support.

3. The vehicle of claim 1, wherein the spacer member is coupled to the side support and is spaced apart from the drive unit.

4. The vehicle of claim 1, wherein the spacer member is repositionable from a disengaged position, in which the spacer member is detached and spaced apart from one of the drive unit and the side support, to an engaged position, in which the spacer member contacts the drive unit and the side support.

5. The vehicle of claim 4, further comprising a suspension mount coupled to the side support, wherein the spacer member contacts the suspension mount in the engaged position.

6. The vehicle of claim 1, further comprising a suspension mount coupled to the side support, wherein the suspension mount is positioned rearward from the crankshaft in the vehicle longitudinal direction.

7. The vehicle of claim 6, wherein at least a portion of the spacer member is aligned with the suspension mount in the vehicle longitudinal direction.

8. A vehicle comprising:
a side support extending in a vehicle longitudinal direction;
a suspension mount coupled to the side support at a position rearward of at least one of a crankshaft of the drive unit and a drive unit centerline in the vehicle longitudinal direction, the suspension mount extending inboard of the side support;
a drive unit spaced apart from the side support in a vehicle lateral direction; and
a spacer member positioned between the side support and the drive unit in the vehicle lateral direction, wherein the spacer member is coupled to one of the drive unit and the side support, and the spacer member is detached and spaced apart from the other of the drive unit and the side support, and wherein at least a portion of the spacer member is aligned with the suspension mount in the vehicle longitudinal direction.

9. The vehicle of claim 8, wherein the spacer member is coupled to the drive unit and is spaced apart from the side support.

10. The vehicle of claim 8, wherein the spacer member is coupled to the side support and is spaced apart from the drive unit.

11. The vehicle of claim 8, wherein the spacer member is repositionable from a disengaged position, in which the spacer member is detached and spaced apart from one of the drive unit and the side support, to an engaged position, in which the spacer member contacts the drive unit and the side support.

12. The vehicle of claim 11, wherein the spacer member contacts the suspension mount in the engaged position.

13. The vehicle of claim 11, wherein the spacer member is spaced apart from the side support in the disengaged position.

14. A vehicle comprising:
a side support extending in a vehicle longitudinal direction;
a drive unit spaced apart from the side support in a vehicle lateral direction, wherein the drive unit comprises a drive unit centerline that extends through a center of mass of the drive unit in the vehicle lateral direction; and
a spacer member positioned between the side support and the drive unit in the vehicle lateral direction, wherein the spacer member is coupled to one of the drive unit and the side support, and the spacer member is detached and spaced apart from the other of the drive unit and the side support, and wherein the spacer member is positioned rearward of the drive unit centerline in the vehicle longitudinal direction.

15. The vehicle of claim 14, wherein the spacer member is coupled to the drive unit and is spaced apart from the side support.

16. The vehicle of claim 14, wherein the spacer member is coupled to the side support and is spaced apart from the drive unit.

17. The vehicle of claim 14, wherein the spacer member is repositionable from a disengaged position, in which the spacer member is detached and spaced apart from one of the drive unit and the side support, to an engaged position, in which the spacer member contacts the drive unit and the side support.

18. The vehicle of claim 17, further comprising a suspension mount coupled to the side support, wherein the spacer member contacts the suspension mount in the engaged position.

19. The vehicle of claim 14, wherein the drive unit comprises a crankshaft, and the spacer member is positioned rearward of the crankshaft.

20. The vehicle of claim 14, further comprising a suspension mount coupled to the side support, wherein the drive unit centerline is positioned forward of the suspension mount in the vehicle longitudinal direction.

* * * * *